(12) United States Patent
Reuss

(10) Patent No.: US 7,676,248 B2
(45) Date of Patent: Mar. 9, 2010

(54) VOICE RECOGNITION SCRIPT FOR HEADSET SETUP AND CONFIGURATION

(75) Inventor: Edward L. Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1042 days.

(21) Appl. No.: 11/367,266

(22) Filed: Mar. 2, 2006

(65) Prior Publication Data

US 2007/0207767 A1    Sep. 6, 2007

(51) Int. Cl.
*H04B 1/38* (2006.01)
(52) U.S. Cl. .................. 455/563; 455/456.3; 455/456.5; 455/550.1; 455/517; 379/59; 379/60; 370/328; 701/33
(58) Field of Classification Search ................ 455/563, 455/456.3, 550.1, 517, 414.3, 415, 533.1; 379/59, 60; 370/328, 329, 341; 701/33, 701/246, 247; 709/218, 219
See application file for complete search history.

(56) References Cited

U.S. PATENT DOCUMENTS

| | | | | |
|---|---|---|---|---|
| 4,682,368 | A | * | 7/1987 | Takahashi .................. 340/7.21 |
| 5,465,378 | A | * | 11/1995 | Duensing et al. ............ 715/233 |
| 6,236,969 | B1 | | 5/2001 | Ruppert et al. |
| 6,662,163 | B1 | * | 12/2003 | Albayrak et al. ............ 704/275 |
| 6,836,651 | B2 | * | 12/2004 | Segal et al. .................. 455/405 |
| 6,952,676 | B2 | * | 10/2005 | Sherman ...................... 704/270 |
| 6,963,760 | B2 | * | 11/2005 | Piwowarski ................. 455/563 |
| 2002/0013784 | A1 | * | 1/2002 | Swanson .................. 707/104.1 |
| 2005/0216268 | A1 | | 9/2005 | Kannappan |
| 2008/0270419 | A1 | * | 10/2008 | Watanabe .................... 707/10 |
| 2009/0061947 | A1 | * | 3/2009 | Park et al. ................... 455/566 |

FOREIGN PATENT DOCUMENTS

WO    WO2005096602 A    10/2005

* cited by examiner

*Primary Examiner*—Minh D Dao
(74) *Attorney, Agent, or Firm*—Intellectual Property Law Office of Thomas Chuang

(57) ABSTRACT

A wireless local area network system and a headset for the system. The headset uses voice input information to set up parameters needed to connect the headset to the corresponding access point and then start the connection process. When the connection fails or succeeds an appropriate voice prompt or visible signal tells the user the headset's connection status.

29 Claims, 3 Drawing Sheets

VOICE RECOGNITION SCRIPT FOR HEADSET SETUP AND CONFIGURATION

BACKGROUND

1. Field of the Invention

This invention relates generally to the management of wireless headsets and specifically to the issue of setting up a wireless headset with an access point for the first time. This involves set up and configuration of wireless headsets.

2. Background Art

A wireless headset is a physically small device with a very restricted user interface, normally consisting of one to four buttons and one or two Light Emitting Diodes (LEDs). Furthermore, a wireless headset must be associated or paired with another device across the wireless medium, such as a base adapter or access point connected to a telephone used by cordless telephony technologies like DECT or DSSS, a Bluetooth enabled cellular telephone used by Bluetooth enabled headsets, or an 802.11 Access Point (AP) as used by an IEEE 802.11 enabled headset.

In all cases the headset and the corresponding device must be able to exchange information for pairing or associating exclusively with each other so as to set up an exclusive connection for telephony. Examples are a four digit passcode for Bluetooth or the SSID of the AP and possibly a security encryption key for 802.11.

Previous solutions used a default pass code that was always known to the user. Unfortunately, this usually meant that the user never changed this passcode and therefore risked having others nearby "hijack" control of their headset. Furthermore, the user may often forget the passcode, rendering the headset useless if the pairing needs to be repeated for whatever reason. Also, the corresponding device then needs to have some means for the user to enter the passcode. This is fine on a cellular telephone which includes a graphical user interface with a keyboard, but is not appropriate for a cordless telephony base adapter or an 802.11 AP, neither of which include means for the user to manually add this information.

Another previous solution was to press a non-operational combination of keys on both the headset and the corresponding device to initiate an automated pairing sequence. This is not adequate for an 802.11 AP as it does not tell the AP whether the device has authorization to pair with this particular AP or not. Furthermore, 802.11 APs are often located in places that are not accessible to the headset user, such as in the ceiling, in an adjacent locked room or atop a tall pole.

A third previous solution was to include a small display along with some additional buttons onto the headset. This solution adds significantly to the cost of the headset and makes it substantially bulkier and heavier while worn on the user's head.

SUMMARY OF THE INVENTION

A voice recognition module, either as a small circuit board or as additional software running on an existing processor, is added to the headset. Whenever the headset requires the information necessary to associate or pair with the corresponding device (access point, handset, base adapter or 802.11 AP), an initialization script is started. This script may be initiated whenever the headset has no information about a correspondent device to connect with, or when the user requests it, perhaps via a multiple key press during the power up phase.

This script uses voice output to prompt the user for the information required and voice recognition to input the required information via voice input. This permits the user to just listen to the voice prompts and then speak the required information into the headset.

The headset uses the voice input information to set up the parameters needed to connect to the corresponding device and then starts the connection process. When the connection has succeeded, a voice prompt tells the user that the headset is now connected.

The voice script and embedded voice recognition permits the user to set up the information for connecting to any corresponding device without extra buttons, keypad or display.

This is provided by a wireless local area network system for connecting a user to a communication network. The wireless local area network includes an access point. The access point has a unique access point parameter associated to and stored in the access point. The access point is adapted for connection to a network and has a transceiver for wireless connection to a headset. Typically the transceiver is one or two integrated circuit chips adapted for connection to a power supply, an input (microphone), an output (antenna), and digital signal processing means.

The system also includes a headset. The headset is adapted for wireless connection to the access point and includes a transceiver, a microphone, a speaker, a memory, a microprocessor, voice synthesis means for issuing voice prompts, and speech recognition means for processing a user response to the voice prompts. In one embodiment the voice synthesis means includes a microprocessor, a memory, and voice synthesis code, and the speech recognition means comprises a microprocessor, a memory, and speech recognition code.

The memory associated to either or both of the voice synthesis means and the voice recognition means may be the same or different memories, and is a non-volatile memory, such as a flash memory, a PROM, or an EEPROM.

The access point has a unique access point parameter. This unique access point parameter is at least one of an encryption key, a network address, an arbitrary number, or concatenations thereof. The unique access point parameter may be represented by one of a hexadecimal number, a binary coded digital number, an octal number, or ASCII text.

Key to the system is that the headset is adapted to audibly query a user for the access point parameter, and to receive, decode, and store a verbal response from the user. The integrated system of headset and access point utilizes the stored verbal response, as a parameter code, to carry out communications between the access point and the headset.

The access point may be a PSTN terminal, a VoIP terminal, or even a repeater.

The headset adapted for wireless connection to the access point comprises a transceiver, a microphone, a speaker, a memory, a microprocessor, voice synthesis means for issuing voice prompts, and speech recognition means for processing a user response to the voice prompts.

The voice synthesis means comprises a microprocessor, a memory, and voice synthesis code, and the speech recognition means comprises a microprocessor, a memory, and speech recognition code. The microprocessor and memory may be the same elements for both the voice synthesis means and the speech recognition means. Preferably the memory is non-volatile memory, such as a flash memory, a PROM, or an EEPROM.

The headset is adapted to audibly query a user for the access point parameter, as well as to receive, decode, and store a verbal response from the user. The parameter code is used to carry out communications between the access point and the headset.

A further aspect of the invention is a method of instantiating a wireless headset to a network access point, where the access point has a unique access point parameter for granting access thereto. The method comprises the steps of:

a) the headset presenting a voice prompt for the unique access point parameter to a user, receiving a verbal response to the voice prompt from the user; decoding the verbal response and storing the decoded verbal response, and transmitting the decoded verbal response to the access point as an access parameter;

b) the access point either:
i) accepts the decoded verbal response as an access parameter, or
ii) declines the decoded verbal response as an access parameter and transmitting an indication thereof to the headset.

THE FIGURES

DETAILED DESCRIPTION

A voice recognition module, either as a small circuit board or as additional software running on an existing processor, is added to the headset. Whenever the headset requires the information necessary to associate or pair with the corresponding device (access point, handset, base adapter or 802.11 AP), an initialization script is started. This script may be initiated whenever the headset has no information about a correspondent device to connect with, or when the user requests it, perhaps via a multiple key press during the power up phase.

This script uses voice output to prompt the user for the information required and voice recognition to input the required information via voice input. This permits the user to just listen to the voice prompts and then speak the required information into the headset.

The headset uses the voice input information to set up the parameters needed to connect to the corresponding device and then starts the connection process. When the connection has succeeded, a voice prompt tells the user that the headset is now connected.

The voice script and embedded voice recognition permits the user to set up the information for connecting to any corresponding device without extra buttons, keypad or display.

Figure 1:
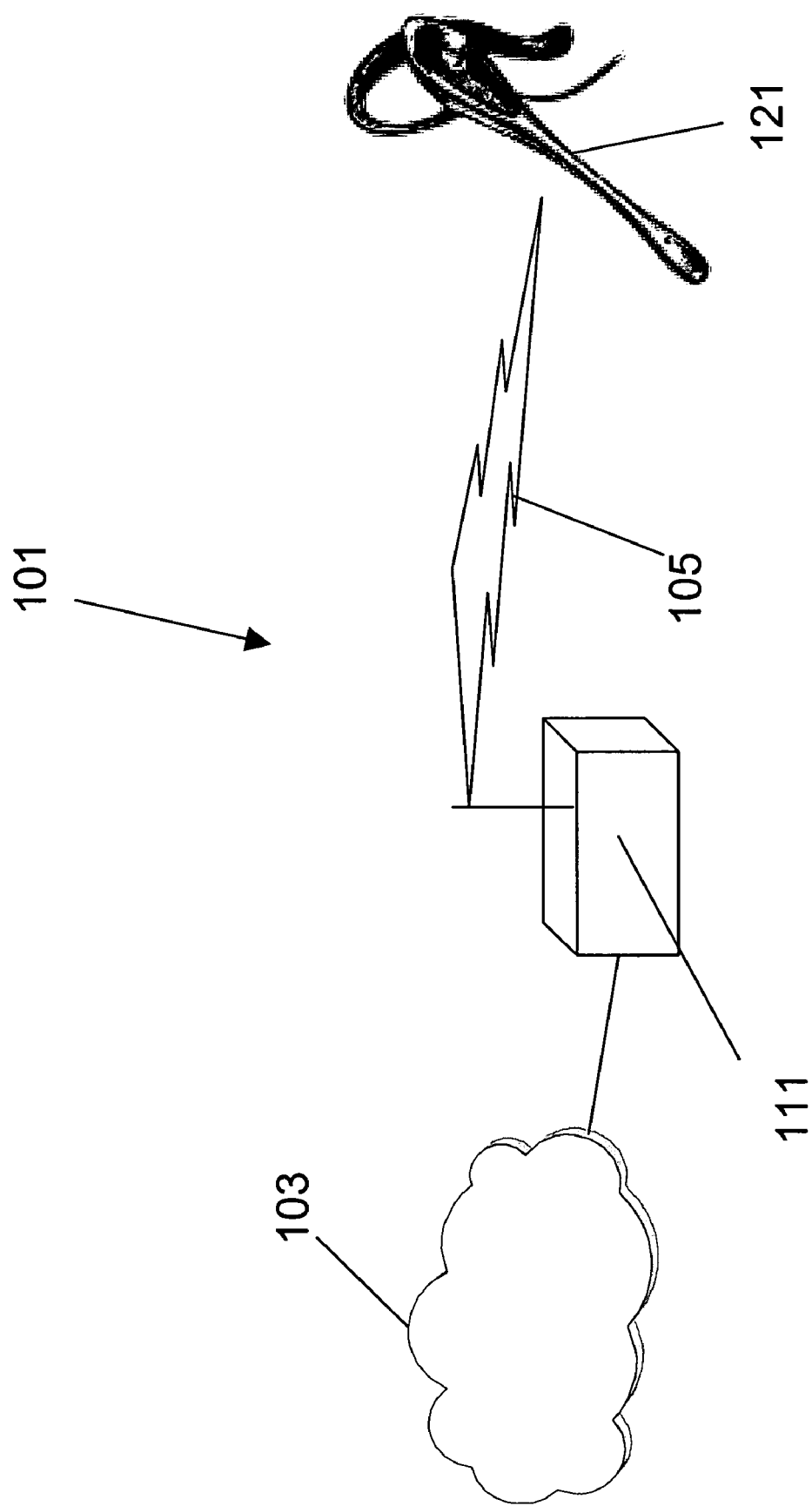
FIG. 1 is an illustration of a system connected to a communications network, and including a headset, an access point, and a wireless local area network therebetween.

This is provided, as illustrated in FIG. 1, by a wireless local area network system 101 for connecting a user with a headset 121 to a communication network 103. The wireless local area network 101 includes an access point 101. The access point 101 has a unique access point parameter associated to and stored in the access point 111. The access point 111 is adapted for connection to an external network 103 and has a transceiver for wireless connection to a headset 121, also including a transceiver 301. Typically the transceiver 301 in the headset 121 is one or two integrated circuit chips adapted for connection to a power supply, an input (microphone) 319, an output (antenna) 329, and digital signal processing means.

The system also includes the headset 121. The headset is adapted for wireless connection to the access point 111 and includes a transceiver 301, a microphone 319, a speaker 317, a memory 313, a microprocessor 315, the microprocessor including therein voice synthesis means for issuing voice prompts, and speech recognition means for processing a user response to the voice prompts. In one embodiment the voice synthesis means includes a microprocessor, a memory, and voice synthesis code, and the speech recognition means comprises a microprocessor, a memory, and speech recognition code.

Figure 2:
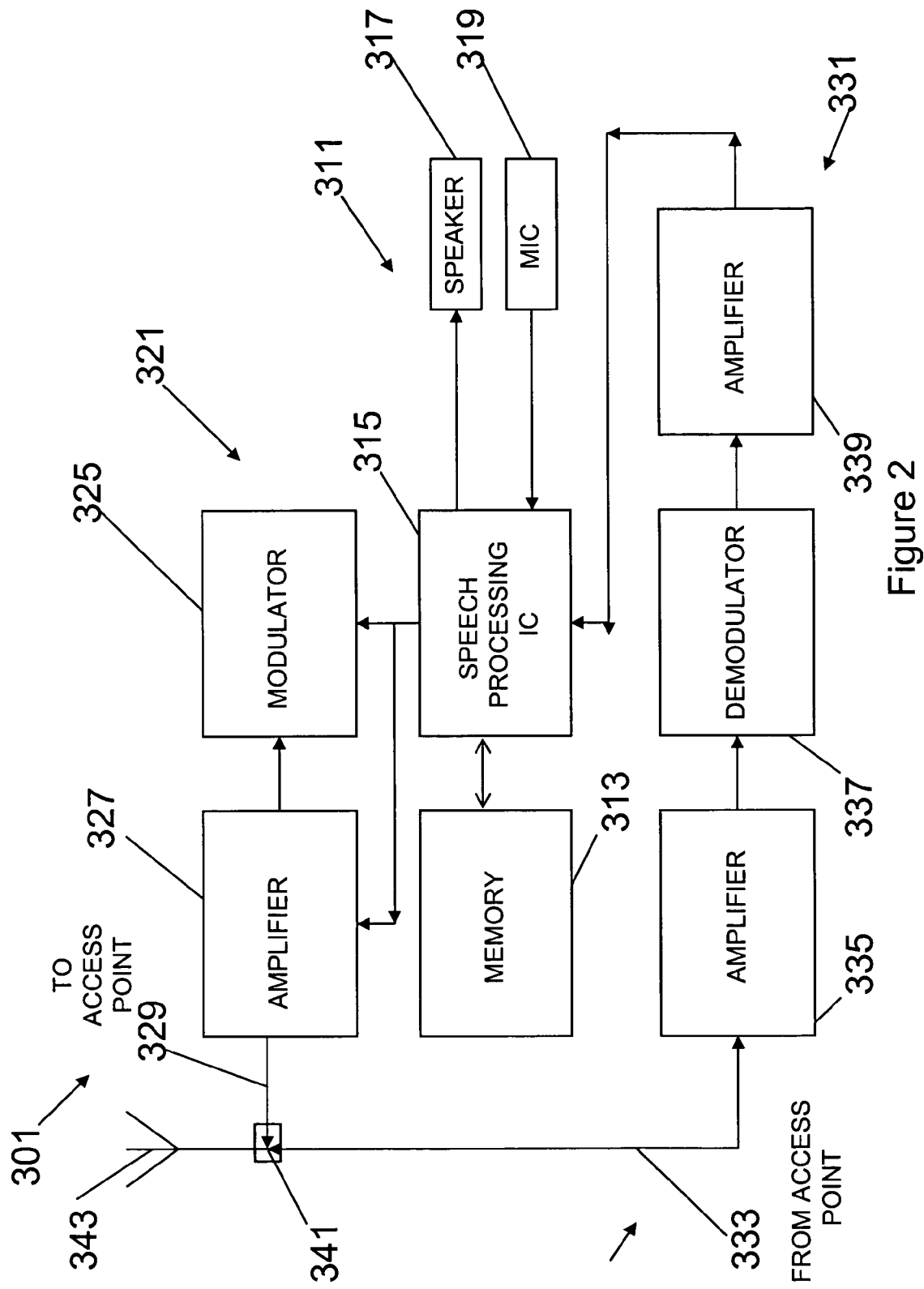
FIG. 2 is a generalized schematic illustration of a headset including a speaker, a microphone, a central processor unit, a memory, a transceiver and an antenna.

FIG. 2 shows the transceiver 301 in greater detail. The transceiver 301 includes speech processing means 311, with a memory 313, a speech processing integrated circuit 315 or circuits, a microphone 319 providing inputs to the speech processing integrated circuit or circuits 315, and a speaker receiving outputs from the speech processing integrated circuit 315 or circuits. The transceiver also includes a transmitter element 321. In one exemplification the transmitter 321 includes a modulator 325, an amplifier 327, and a lead 329 through an transmit/receive switch 341 to an antenna 343 to the access point.

The transceiver 301 also includes a receiver 331, shown in FIG. 2 with an antenna 343, connected through a transmit/receive switch 341 and lead, from the access point to a first amplifier stage 335, an rf element 337 with a demodulator, and an optional output amplifier 339. This amplifier provides signals from the receiver 331 to speech processing module 311 including the speech processing integrated circuit 315.

The circuits shown in FIG. 2 are not exclusive, only exemplary, and various modifications are contemplated. This would be a function of, for example, the frequency and range, such as the 440 MegaHertz band, 900 MegaHertz band, the 2.4 GigaHertz band, and the 5.8 GigaHertz band, as well as various digital spread spectrum modes and various encryption modes.

The memory 313 associated to either or both of the voice synthesis means and the voice recognition means may be the same or different memories, and is a non-volatile memory, such as a flash memory, a PROM, or an EEPROM.

The access point 111 has a unique access point parameter. This unique access point parameter is at least one of an encryption key, a network address, an arbitrary number, or concatenations thereof. The unique access point parameter may be represented by one of a hexadecimal number, a binary coded digital number, an octal number, or ASCII text.

Key to the system is that the headset 121 is adapted to audibly query a user for the access point parameter, and to receive, decode, and store a verbal response from the user. The integrated system of headset and access point utilizes the stored verbal response, as a parameter code, to carry out communications between the access point and the headset. The access point 111 may be a PSTN terminal, a VoIP terminal, or even a repeater.

The headset 121 adapted for wireless connection to the access point 111 comprises a transceiver, a microphone, a speaker, a memory, a microprocessor, voice synthesis means for issuing voice prompts, and speech recognition means for processing a user response to the voice prompts, as described with respect to and illustrated generally in FIG. 2.

The headset is adapted to audibly query a user for the access point parameter, as well as to receive, decode, and store a verbal response from the user. The parameter code is used to carry out communications between the access point and the headset.

Figure 3:
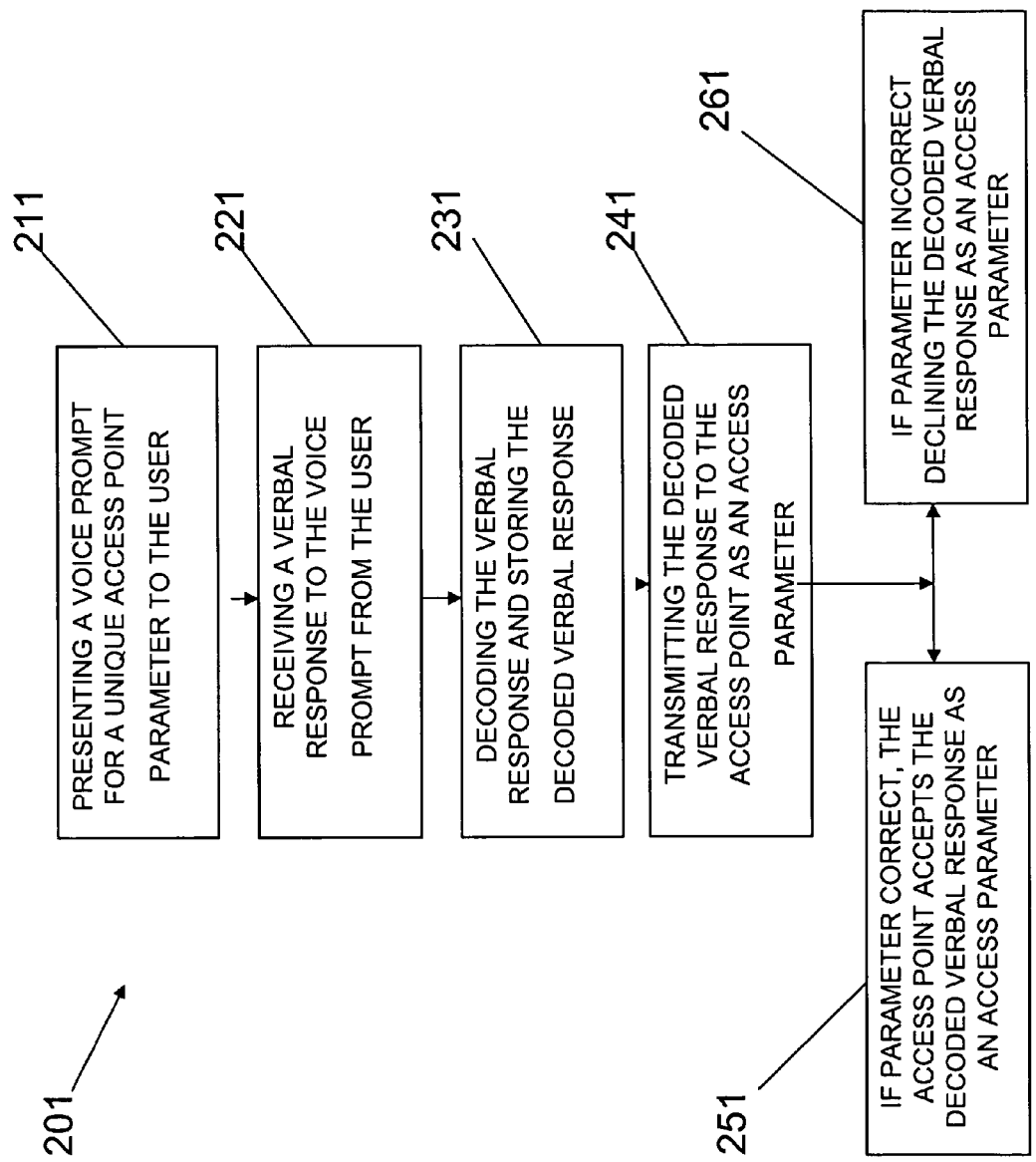
FIG. 3 is a generalized flow chart of a method of carrying out the invention.

A further aspect of the invention is a method of instantiating a wireless headset 121 to a network access point 111, where the access point 111 has a unique access point parameter for granting access thereto. The method, illustrated in FIG. 3, comprises the steps of:

a) the headset presenting a voice prompt for the unique access point parameter to a user 211, receiving a verbal response to the voice prompt from the user 221; decoding the verbal response and storing the decoded verbal response 231, and transmitting the decoded verbal response to the-access point as an access parameter 241;

b) the access point either:
i) accepts the decoded verbal response as an access parameter 251, or ii) declines the decoded verbal response as an access parameter and transmitting an indication thereof to the headset 261.

While the invention has been described with respect to certain preferred embodiments and exemplifications, it is not intended to limit the scope of the invention thereby, but solely by the claims appended hereto.

I claim:

1. A wireless local area network system for connecting a user to a communication network, said wireless local area network including:
   a) an access point having a unique access point parameter associated to and stored in said access point, said access point adapted for connection to a network and comprising a transceiver for wireless connection to a headset; and
   b) a headset adapted for wireless connection to the access point and comprising a transceiver, a microphone, a speaker, a memory, a microprocessor, voice synthesis means for issuing voice prompts, and speech recognition means for processing a user response to said voice prompts, the user response comprising the unique access point parameter.

2. The system of claim 1 wherein the voice synthesis means comprises a microprocessor, a memory, and voice synthesis code.

3. The system of claim 1 wherein the speech recognition means comprises a microprocessor, a memory, and speech recognition code.

4. The system of claim 1 wherein said voice synthesis means comprises a microprocessor, a memory, and voice synthesis code, and the speech recognition means comprises said microprocessor, said memory, and speech recognition code.

5. The system of claim 4 wherein said memory is non-volatile memory.

6. The system of claim 5 wherein the non-volatile memory is selected from a flash memory, a PROM, and an EEPROM.

7. The system of claim 1 wherein the unique access point parameter comprises at least one of an encryption key, a network address, an arbitrary number, or concatenations thereof.

8. The system of claim 7 wherein the unique access point parameter is represented by one of a hexadecimal number, a binary coded digital number, an octal number, or ASCII text.

9. The system of claim 1 wherein said headset is adapted to audibly query a user for the access point parameter.

10. The system of claim 9 wherein said headset is adapted to receive, decode, and store a verbal response from the user.

11. The system of claim 10 wherein said system is adapted to utilize said parameter code to carry out communications between the access point and the headset.

12. The system of claim 1 wherein the access point is a PSTN terminal.

13. The system of claim 1 wherein the access point is a VoIP terminal.

14. The system of claim 1 wherein the access point is a repeater.

15. A wireless headset for use in a wireless local area network system connected to a communication network, and including an access point and the headset, the access point having a unique access point parameter associated to and stored therein, and comprising a transceiver for wireless connection to the headset; the headset adapted for wireless connection to the access point and comprising a transceiver, a microphone, a speaker, a memory, a microprocessor, voice synthesis means for issuing voice prompts, and speech recognition means for processing a user response to said voice prompts, the user response comprising the unique access point parameter.

16. The wireless headset of claim 15 wherein the voice synthesis means comprises a microprocessor, a memory, and voice synthesis code.

17. The wireless headset of claim 15 wherein the speech recognition means comprises a microprocessor, a memory, and speech recognition code.

18. The wireless headset of claim 15 wherein said voice synthesis means comprises a microprocessor, a memory, and voice synthesis code, and the speech recognition means comprises said microprocessor, said memory, and speech recognition code.

19. The system of claim 18 wherein said memory is non-volatile memory.

20. The system of claim 19 wherein the non-volatile memory is selected from a flash memory, a PROM, and an EEPROM.

21. The headset of claim 15 wherein the unique access point parameter is represented by one of a hexadecimal number, a binary coded digital number, an octal number, or ASCII text.

22. The headset of claim 21 wherein said headset is adapted to audibly query a user for the access point parameter.

23. The headset of claim 22 wherein said headset is adapted to receive, decode, and store a verbal response from the user.

24. The headset of claim 23 wherein said system is adapted to utilize said parameter code to carry out communications between the access point and the headset.

25. Method of instantiating a wireless headset to a network access point, said access point having a unique access point parameter for granting access thereto, said method comprising:
   a) said wireless headset presenting a voice prompt for said unique access point parameter to a user;
   b) receiving a verbal response to the voice prompt from a user;
   c) decoding the verbal response and storing the decoded verbal response;
   d) transmitting the decoded verbal response to the access point as an access parameter; and
   e) the access point either:
      i) accepting the decoded verbal response as an access parameter, or
      ii) declining the decoded verbal response as an access parameter and transmitting an indication thereof to the headset.

26. The method of claim 25 wherein the unique access point parameter comprises at least one of an encryption key, a network address, an arbitrary number, or concatenations thereof.

27. The method of claim 26 comprising storing the unique access point parameter as a binary number, an octal number, a binary coded decimal number, or a hexadecimal number.

28. The method of claim 25 comprising storing the voice prompt in a memory in the headset and serving the voice prompt to the user in response to a user action.

29. The method of claim 25 comprising receiving, and decoding a user response to the voice prompt and transmitting from a transmitter in the headset the decoded user response to the access point.

* * * * *